United States Patent
Wilson et al.

(10) Patent No.: US 8,478,974 B2
(45) Date of Patent: Jul. 2, 2013

(54) METHOD AND SYSTEM FOR REDUCING AN IMPACT OF MALWARE DURING A BOOTING SEQUENCE

(75) Inventors: Ryan Matthew Wilson, Utica, NY (US); Joseph James Sharkey, Deerfield, NY (US); Michael Joseph Sieffert, Rome, NY (US)

(73) Assignee: Assured Information Security, Inc., Rome, NY (US)

(*) Notice: Subject to any disclaimer, the term of this patent is extended or adjusted under 35 U.S.C. 154(b) by 501 days.

(21) Appl. No.: 12/821,845

(22) Filed: Jun. 23, 2010

(65) Prior Publication Data

US 2011/0320797 A1     Dec. 29, 2011

(51) Int. Cl.
*G06F 9/00* (2006.01)
(52) U.S. Cl.
USPC .................................................. 713/1; 713/2
(58) Field of Classification Search
USPC ............................................ 713/1, 2; 726/22
See application file for complete search history.

(56) References Cited

U.S. PATENT DOCUMENTS

| | | | | |
|---|---|---|---|---|
| 5,007,082 | A * | 4/1991 | Cummins | 713/164 |
| 6,282,657 | B1 * | 8/2001 | Kaplan et al. | 726/1 |
| 7,114,066 | B1 * | 9/2006 | Swaminathan | 713/1 |
| 8,250,273 | B2 * | 8/2012 | Konireddygari et al. | 710/269 |
| 2003/0140205 | A1 * | 7/2003 | Dahan et al. | 711/163 |
| 2003/0140244 | A1 * | 7/2003 | Dahan et al. | 713/200 |
| 2003/0140245 | A1 * | 7/2003 | Dahan et al. | 713/200 |

OTHER PUBLICATIONS

Heasman, J., "Implementing and Detecting an ACPI BIOS Rootkit" Black Hat Federal, <http://www.blackhat.com/presentations/bh-federal-06/BH-Fed-06-Heasman.pdf> (Jan. 2006).
Heasman, J., "Implementing and Detecting a PCI Rootkit," Presented at Black Hat DC 2007, 15 pages (2006).
Intel®, "Creating a Secure Computing Environment. Hardware-Based Security Features Further Protect Against Software-Based Attacks," Technology Brief, Intel® Trusted Execution Technology (Intel® TXT), Embedded Computing, (2009).
Salihun, D., "Hijacking the System BIOS," BIOS Disassembly Ninjutsa Uncovered, pp. 391-395 (2007).

* cited by examiner

*Primary Examiner* — Chun Cao
(74) *Attorney, Agent, or Firm* — Heslin Rothenberg Farley & Mesiti P.C.

(57) ABSTRACT

Methods for reducing the impact of malware during a booting sequence for an interrupt driven computing device are disclosed. One or more parameters associated with an interrupt vector table (IVT) are manipulated to force the computing device into a clean state following a system level portion of the booting sequence. In another embodiment, occurring prior to the loading of an operating system or a call to a non-returnable main( ) function, one or more unused interrupt vectors in an IVT are replaced. A function filter is implemented for one or more interrupt vectors in the IVT to disallow unnecessary interrupt functions from being executed. One or more required interrupt vector functions are replaced with one or more corresponding custom vector functions. One or more memory locations are wiped if the one or more memory locations do not hold at least a portion of the IVT and/or the interrupt vector functions.

39 Claims, 8 Drawing Sheets

METHOD AND SYSTEM FOR REDUCING AN IMPACT OF MALWARE DURING A BOOTING SEQUENCE

GOVERNMENT FUNDING

This invention was made with Government support under contract number FA8650-09-D-1643, awarded by the Air Force Research Laboratory under the Small Business Innovation Research Program (SBIR). The Government has certain rights in this invention.

FIELD

This technology relates to methods for mitigating malware attacks, and more specifically to methods and systems for reducing the impact of malware during a booting sequence for an interrupt driven computing device.

BACKGROUND

Malware, short for malicious software, is software designed to infiltrate a computing device without the owner's informed consent. The expression "malware" is a general term used by computer professionals to mean a variety of forms of hostile, intrusive, or annoying software or program code. Malware may include, but is not limited to computer viruses, worms, Trojan horses, spyware, dishonest adware, crimeware, and rootkits. Malware can be loaded into a computing device during a variety of timeframes, however, malware that is loaded during the early stages of a computing device's boot process is particularly difficult to detect and/or prevent because such malware has the potential to subvert and compromise the computing device before an operating system and its corresponding defenses are loaded.

Current computer devices that load and run an operating system are largely reliant on anti-virus programs for protection from malware. Anti-virus programs typically assume that the system is in a clean state when they are loaded into memory. This assumption is made because the anti-virus programs execute within the operating system, and expect the operating system kernel to be loaded before any additional software. Therefore, malware that is loaded before an operating system, such as during the device's boot process, has significant potential to subvert an anti-virus program's security measures. Computing devices with embedded systems that do not support an operating system are at similar risk for malware being loaded during initial system setup and may be further hampered by a lack of any type of antivirus protection because they may not have an operating system.

While the potential threat of malware execution during the system startup for a computing device is well known, solutions to mitigate such malware threats are lacking. In an effort to try to address malware threats during a system booting sequence, Intel® has introduced the Trusted Execution Technology (TXT) to help provide a protected launch environment. The Intel® environment is provided through the use of software hashing, launch control policies, and BIOS authentication techniques. While the Intel® TXT can be effective in measuring the system state at boot time, it does not fully address mitigating threats in this environment because it deactivates protected computing devices when it recognizes a malware infection. Shut-down computing devices may wait a significant amount of time before an experienced computer professional is able to diagnose the cause of the malware shutdown, remove the problem, and reload any necessary software or firmware. Such downtime is unacceptable, especially for high priority computing devices such as those in hospitals, businesses, financial institutions, law enforcement agencies, governments, and the military. In addition to this shortcoming, to be most effective, TXT must also be built into the hardware for a specific system configuration.

Therefore, there is a need for a flexible and reliable method of reducing an impact of malware during a booting sequence for an interrupt driven computing device without having to deactivate or shut down the computing device.

SUMMARY

A method for reducing the impact of malware during a booting sequence for an interrupt driven computing device is disclosed. One or more parameters associated with an interrupt vector table (IVT) are manipulated to force the computing device into a clean state following a system level portion of the booting sequence.

A system for reducing the impact of malware during a booting sequence is also disclosed. The system has a memory and one or more computing devices. The one or more computing devices are configured to execute a system-level portion of the booting sequence comprising establishment of an interrupt vector table (IVT) in the memory. The one or more computing devices are also configured to manipulate one or more parameters associated with the IVT to force the memory into a clean state following the system-level portion of the booting sequence.

A computer program product comprising a tangible computer readable storage medium readable by a processor and storing instructions thereon for execution by the processor for reducing the impact of malware during a booting sequence for an interrupt driven computing device is further disclosed. The instructions include instructions to manipulate one or more parameters associated with an interrupt vector table (IVT) to force the computing device into a clean state following a system level portion of the booting sequence.

Another method for reducing the impact of malware during a booting sequence for an interrupt driven computing device is also disclosed. This method occurs prior to the loading of an operating system or prior to a call to a non-returnable main( ) function. One or more unused interrupt vectors in an interrupt vector table (IVT) are replaced. A function filter is implemented for one or more interrupt vectors in the IVT to disallow unnecessary interrupt functions from being executed. One or more required interrupt vector functions are replaced with one or more corresponding custom vector functions. One or more memory locations are wiped if the one or more memory locations do not hold at least a portion of the IVT and/or the interrupt vector functions.

This technology effectively removes pre-existing malware from memory, replaces required functionality with trusted code, disallows unused interrupts from being called, and erases remaining system memory to remove malware from memory. This provides an operating system or an embedded system with a root of trust spanning the boot process up to the point directly before executing an operating system loader or calling a non-returnable main( ) function.

Figure 1A:
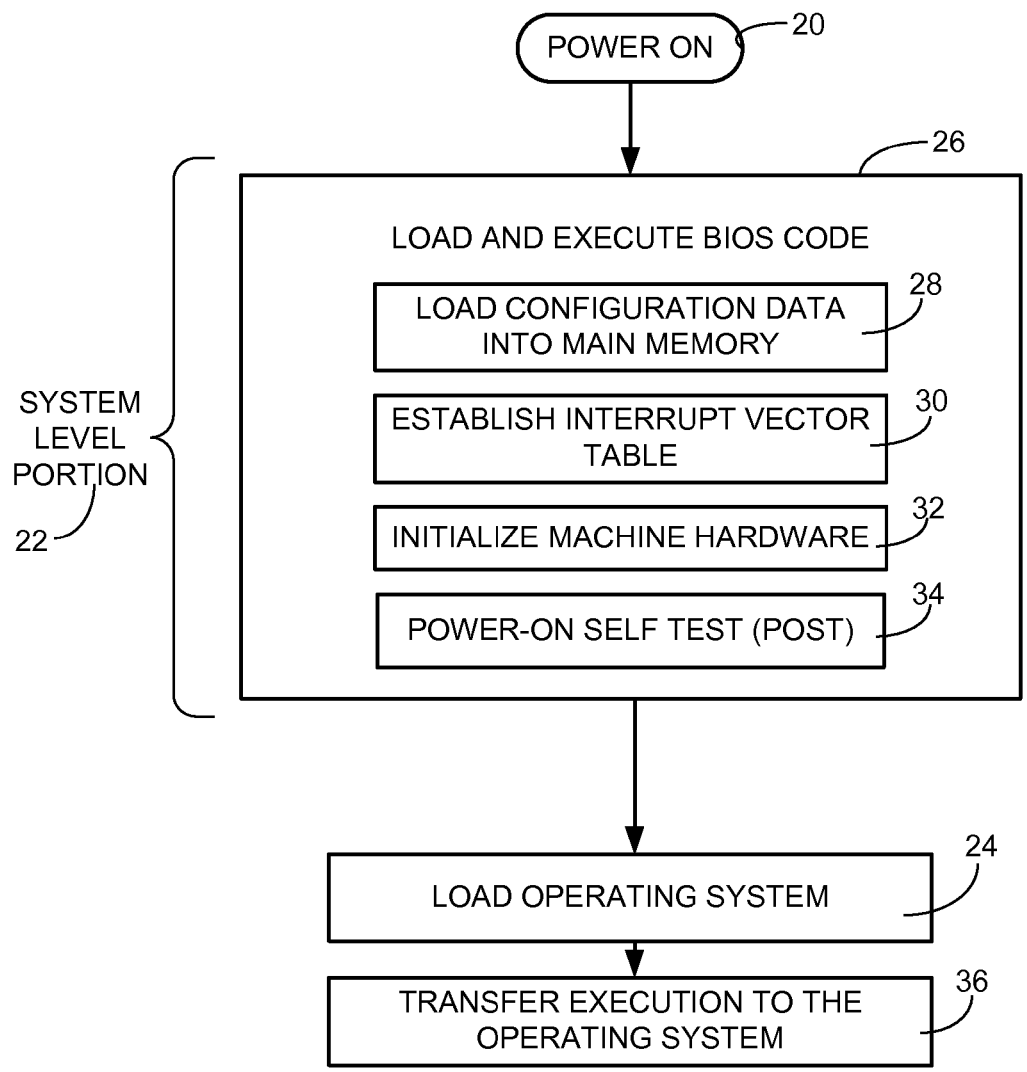
FIG. 1A schematically illustrates an example of a prior art booting process for a computing device that will load an operating system.

It will be appreciated that for purposes of clarity and where deemed appropriate, reference numerals have been repeated in the figures to indicate corresponding features. While the system and method for reducing an impact of malware during a booting sequence are described herein by way of example for several embodiments and illustrative drawings, those skilled in the art will recognize that the system and method for reducing an impact of malware during a booting sequence are not limited to the embodiments or drawings described. It should be understood that the drawings and detailed description thereto are not intended to limit embodiments to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A computing device's central processor is generally set up to execute program code found in Read-Only Memory (ROM) and Random Access Memory (RAM). Modern operating systems and application program code and data are stored on nonvolatile data storage devices, such as, but not limited to, hard disk drives, compact discs, DVD discs, blu-eray discs, optically readable storage media, flash memory cards, USB flash drives, floppy disks, and magnetic storage media. When a computing device is first powered on, it does not have an operating system in ROM or RAM. The computing device must first execute a small program stored in ROM, as part of a booting process, to initialize the computing device to be able to access the nonvolatile devices from which the operating system programs and data may be loaded into RAM.

FIG. 1A schematically illustrates an example of a prior art booting process for a computing device that will load an operating system. When the computing device is powered on 20, a system level portion 22 of the booting sequence occurs prior to the loading 24 of an operating system. In this example, BIOS (Basic Input Output System) code is loaded and executed 26 during the system level portion 22 of the booting sequence. Configuration data may be loaded 28 into a main memory, and an interrupt vector table (IVT) may be established 30. An interrupt vector is the memory address of an interrupt handler, or an index into an array called an interrupt vector table. Interrupt vector tables contain the memory addresses of interrupt handlers. An interrupt is a signal understandable by the computing device indicating the need for attention or an event in software indicating the need for a change in execution. Interrupts cause the processor of a computing device to save its state of execution and begin execution of an interrupt handler. The interrupt handler services the interrupting event by executing code written into memory at the addresses specified in the interrupt vector table. Interrupts can be generated by software or by hardware, as through a connection external to the device. When an interrupt service routine is complete, the context and execution of the original software is restored.

On an x86-based machine, for example, the system BIOS is expected to set up an interrupt vector table (IVT), which provides software with a method of calling functions to manipulate the computing device's hardware during the system's booting sequence. For example, interrupt 0x13 provides a large number of functions that interface and control storage devices such as a hard drive or CD/DVD drive. The IVT includes a list of pointers to code providing the aforementioned functionality. It is trivial for malware to obtain a hook into many of these interrupt vector functions; that is, to alter the memory location that an interrupt points to for the purpose of executing additional code, before allowing the interrupt's original code to execute. Since the IVT is used throughout the booting sequence, it is not typical for an operating system and its corresponding malware defenses to be loaded at the point that an operating system loader will begin to execute.

Still looking at the system level portion 22 of the example booting sequence in FIG. 1A, using functionality provided by the IVT, the machine hardware of the computing device may be initialized 32. Afterwards, the BIOS may start a power-on self test (POST) 34 which tests various components of the computing device, both to make sure the components are present and that they appear to be working properly.

Finally, after the system level portion 22 of the booting sequence is completed, a boot loader which may be resident on either external or internal storage media loads the operating system 24 and transfers execution to the operating system 36.

Those skilled in the art will readily recognize that there are other actions and/or combinations of actions which may occur during the system level portion 22 of the booting sequence illustrated in FIG. 1A. Common to all is the need to establish an interrupt vector table for use during the initialization.

Various types of computing devices, for example, embedded systems, are capable of booting very quickly in some cases, due to their more streamlined booting sequences in certain embodiments. An embedded system may be a computing device designed to perform one or a few dedicated functions often with real-time computing constraints. Such a system may be embedded as part of a complete device often including hardware and mechanical parts. By contrast, a general-purpose computer, such as a personal computer or laptop, is designed to be flexible and to meet a wide range of end-user needs. Embedded systems control many devices in common use today.

Embedded systems are controlled by one or more main processing cores that may be, for example, microcontrollers or digital signal processors. One key characteristic of an embedded system is that it may be dedicated to handle a particular task, which may require very powerful processors. Since embedded systems may be dedicated to specific tasks, design engineers can optimize them to reduce the size and cost of the product while increasing its reliability and performance. Embedded systems, however, may still be subjected to attacks by malware, especially during a booting sequence.

Figure 1B:
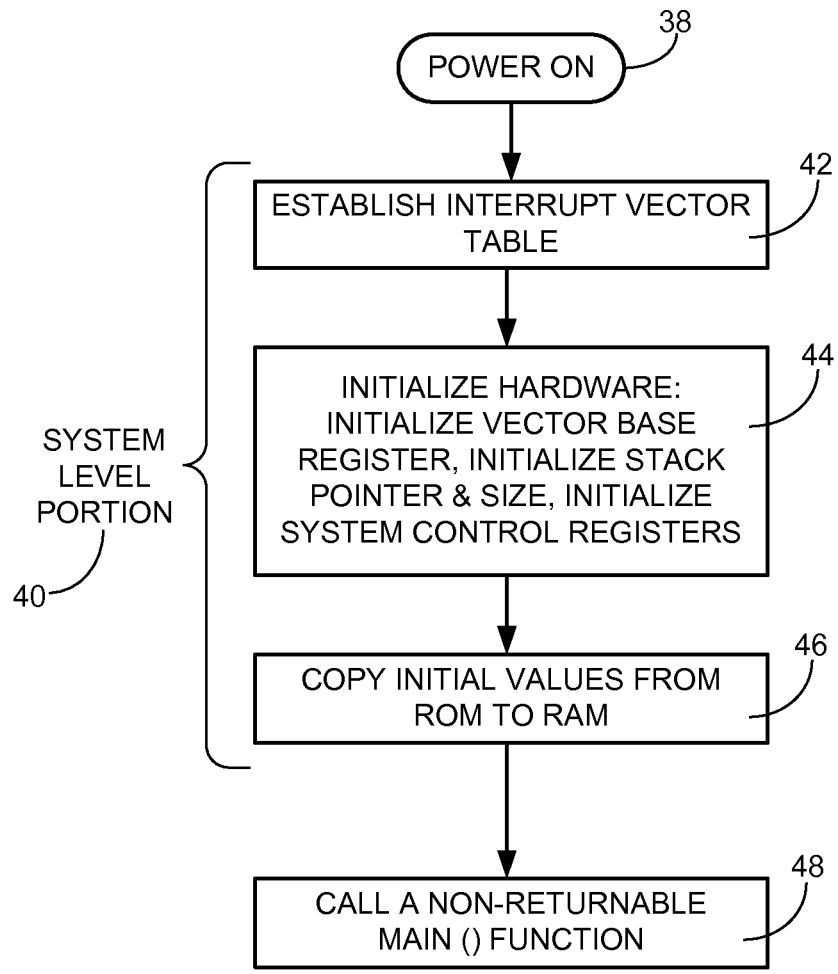
FIG. 1B schematically illustrates an example of a prior art booting process for an embedded system computing device that does not load an operating system.

FIG. 1B schematically illustrates an example of a prior art booting process for an embedded system computing device that does not load an operating system. Like other computing devices, after first being powered on 38, embedded systems have a system level portion 40 of their booting sequence. In this embodiment, an interrupt vector table (IVT) is established 42, the hardware may be initialized 44, which may include initializing a vector base register, initializing a stack pointer and size, and initializing system control registers. Initial data values may also be copied 46 from ROM to RAM. As in other computing devices, there are other actions and/or combinations of actions which may occur during the system level portion 40 of the booting sequence illustrated in FIG. 1B. Common to all is the need to establish an interrupt vector table for use at least during the booting sequence. When the system level portion 40 of the booting sequence is completed, a call may be made to a non-returnable main( ) function 48 which may execute instructions to carry out the programmed functionality of the embedded system.

As discussed previously, computing devices are particularly vulnerable to malware attacks during or after the system level portion of their booting sequence prior to the loading of an operating system or a call to a non-returnable main( ) function. Described herein are embodiments of a method for reducing an impact of malware during a booting sequence for an interrupt driven computing device. By manipulating one or more parameters associated with an interrupt vector table (IVT) the computing device may be forced into a clean state following a system-level portion of the booting sequence.

Figure 2:
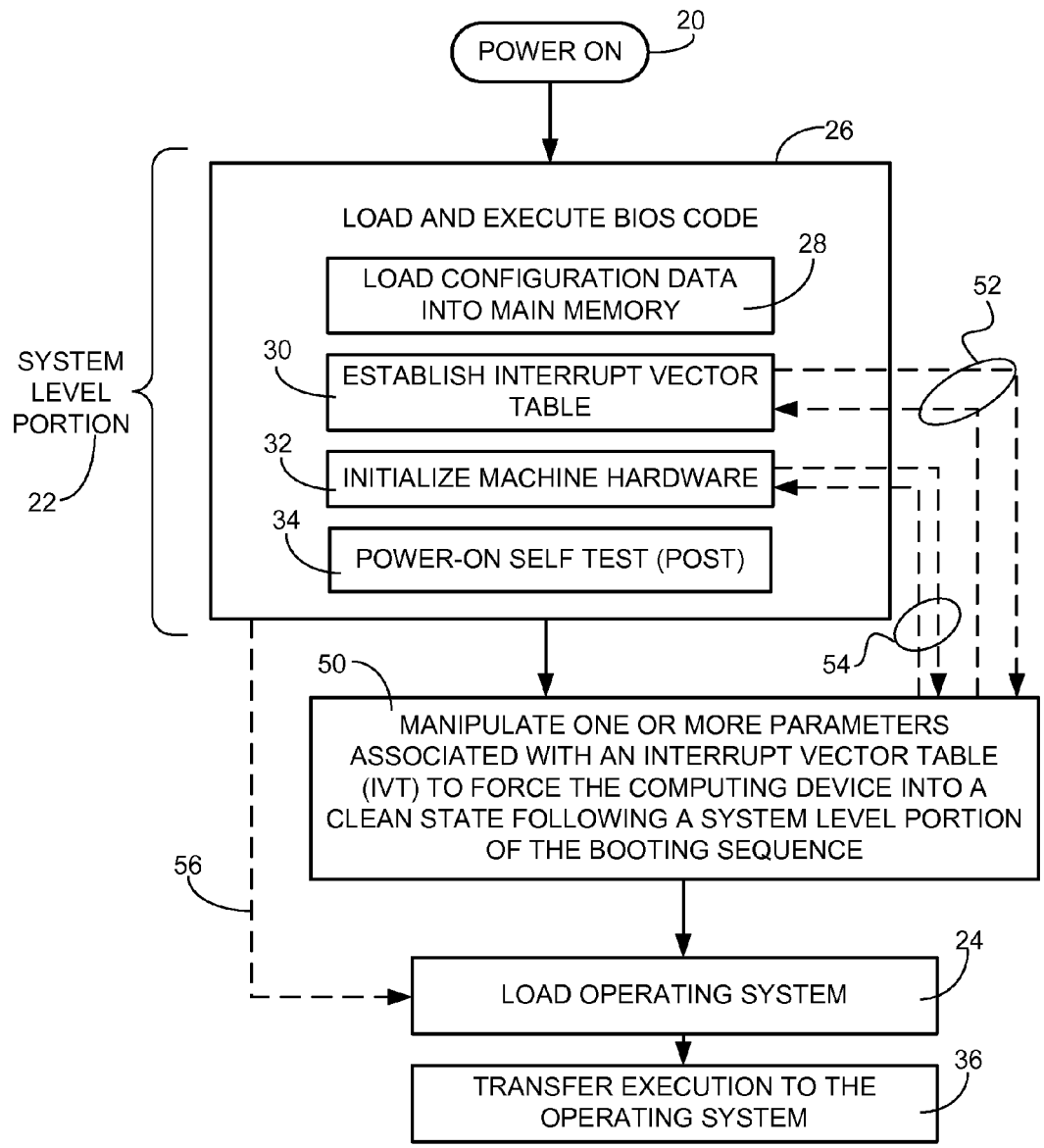
FIG. 2 schematically illustrates one embodiment of a method for reducing an impact of malware during a booting sequence for an interrupt driven computing device that will load an operating system.

FIG. 2 schematically illustrates one embodiment of a method for reducing an impact of malware during a booting sequence for an interrupt driven computing device that will load an operating system. Similar to the process illustrated in FIG. 1A, following power-on 20, a system level portion of the booting sequence takes place. BIOS code is loaded and executed 26. As part of the BIOS code execution, depending on the embodiment, configuration data may be loaded 28, an interrupt vector table may be established 30, machine hardware may be initialized 32, and a power-on self test may be run 34. Such actions and embodiments of a system level portion of a booting sequence have been discussed above. In FIG. 2, however, the boot loader (resident on internal or external storage media), which would normally load the operating system, is modified to manipulate 50 one or more parameters associated with an interrupt vector table (IVT) to force the computing device into a clean state following the system level portion of the booting sequence. There are many embodiments of how the one or more parameters associated with the IVT may be manipulated to force the computing device into a clean state, and they will be discussed in more detail further on in regard to FIG. 4. Although the embodiment of FIG. 2 illustrates the manipulation 50 of the one or more parameters associated with the IVT occurring after the entire system level portion 22 of the booting sequence has occurred, it should be understood that such manipulation 50 may occur following any step of the system level portion 22 of the booting sequence, provided the IVT has been established 30. Therefore, the manipulation 50 which "follows a system level portion of the booting sequence" may be interpreted as occurring after the entire system level portion of the booting sequence has been completed or it may be interpreted as occurring after at least one portion of the system level portion of the booting sequence has taken place, provided the IVT has been established. As a non-limiting example, optional flow lines 52 show the manipulation 50 of one or more parameters associated with the IVT to force the computing device into a clean state occurring after the IVT is established 30 and prior to hardware initialization 32. As another non-limiting example, optional flow lines 54 show the manipulation 50 of one or more parameters associated with the IVT to force the computing device into a clean state occurring after the machine hardware is initialized 32 and prior to the power-on self test 34. In either of these alternate example embodiments, if the manipulation 50 of one or more parameters associated with an IVT to force the computing device into a clean state occurs prior to the completion of the entire system level portion, then alternate flow line 56 can see the process proceed to loading the operating system 24 after the entire system level portion is complete.

Figure 3:
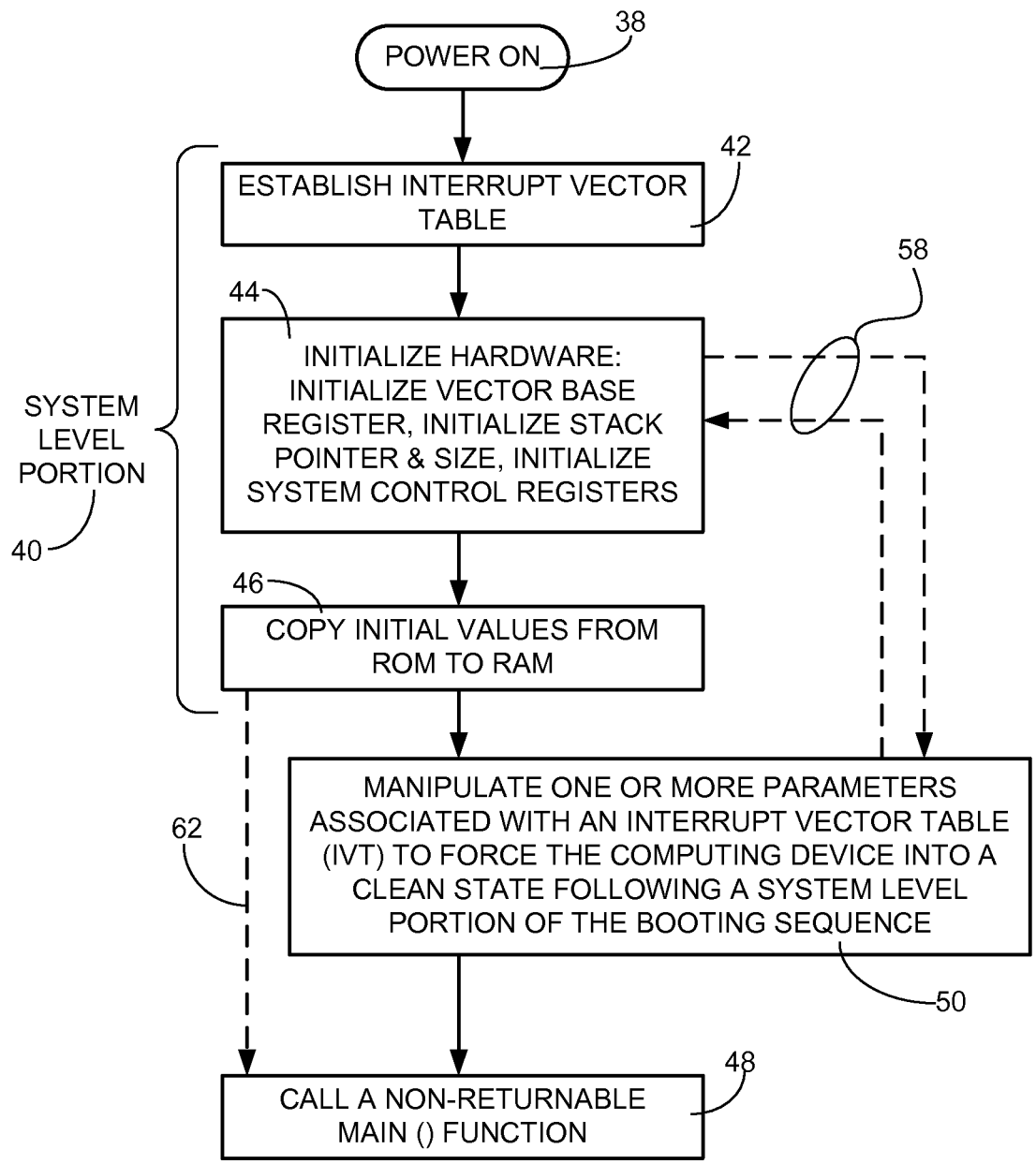
FIG. 3 schematically illustrates one embodiment of a method for reducing an impact of malware during a booting sequence for an interrupt driven computing device that does not load an operating system.

FIG. 3 schematically illustrates one embodiment of a method for reducing an impact of malware during a booting sequence for an interrupt driven computing device that does not load an operating system. Similar to the process illustrated in FIG. 1B, following power-on 38, a system level portion 40 of the booting sequence takes place. Depending on the embodiment, an interrupt vector table is established 42, hardware may be initialized 44, and initial values may be copied 46 from ROM to RAM. Such actions and embodiments of a system level portion 40 of a booting sequence have been discussed above. In FIG. 3, however, the program code which would normally call the non-returnable main( ) function is modified to manipulate 50 one or more parameters associated with the interrupt vector table (IVT) to force the computing device, in this embodiment an embedded system, into a clean state following the system level portion 40 of the booting sequence. There are many embodiments of how the one or more parameters associated with the IVT may be manipulated 50 to force the computing device into a clean state, and they will be discussed in more detail further on in regard to FIG. 4. Although the embodiment of FIG. 3 illustrates the manipulation 50 of the one or more parameters associated with the IVT occurring after the entire system level portion 40 of the booting sequence has occurred, it should be understood that such manipulation 50 may occur following any step of the system level portion 40 of the booting sequence, provided the IVT has been established 30. Therefore, the manipulation 50 which "follows a system level portion of the booting sequence" may be interpreted as occurring after the entire system level portion of the booting sequence has been completed or it may be interpreted as occurring after at least one step of the system level portion of the booting sequence has taken place, provided the IVT has been established. As a non-limiting example, optional flow lines 58 show the manipulation 50 of one or more parameters associated with the IVT to force the computing device into a clean state occurring after the hardware is initialized 44 and prior to copying initial values from ROM to RAM 46. In such an alternate embodiments, if the manipulation 50 of one or more parameters associated with an IVT to force the computing device into a clean state occurs prior to the completion of the entire system level portion, then alternate flow line 62 can see the process proceed to calling a non-returnable main( ) function 48 after the entire system level portion is complete.

Figure 4:
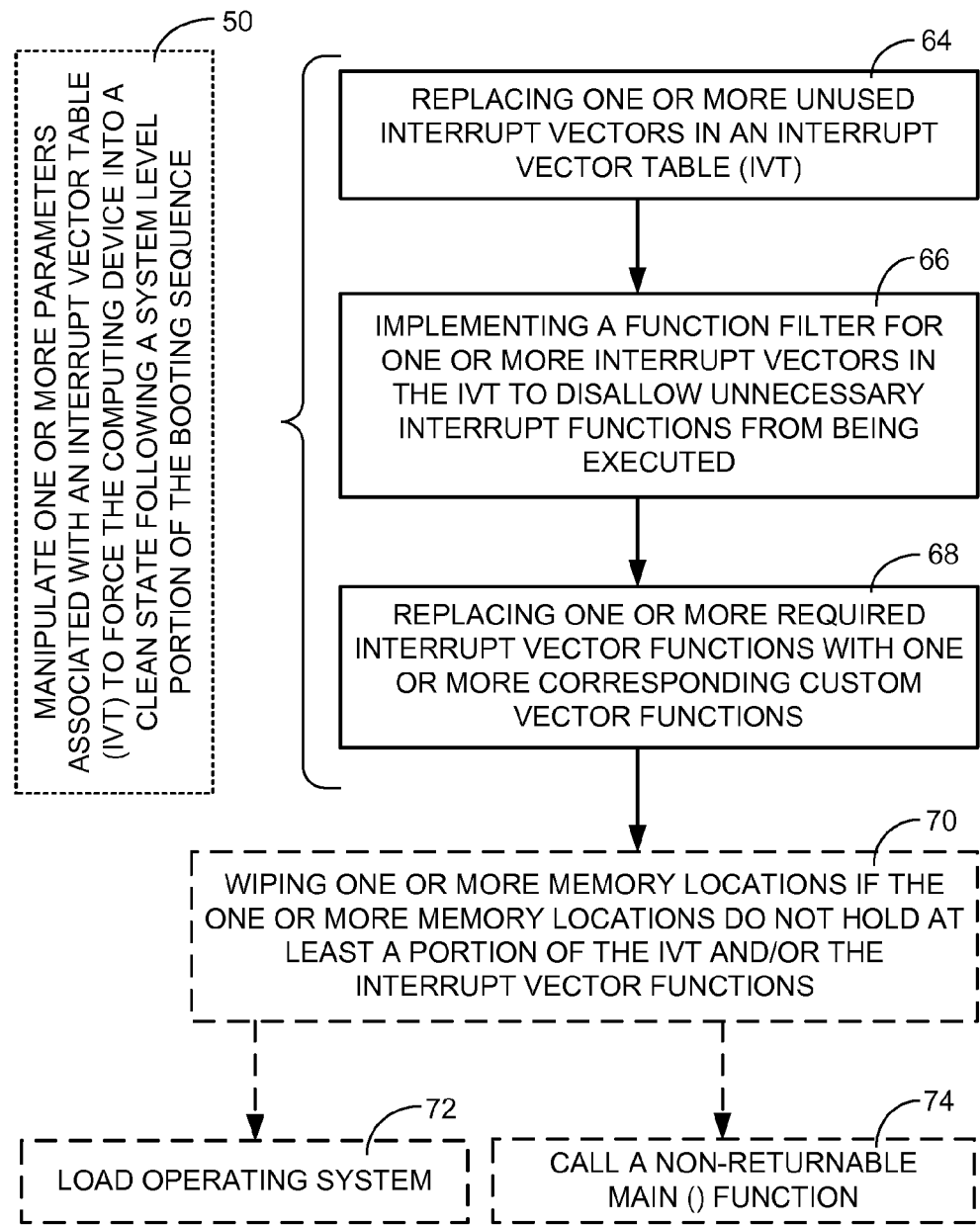
FIG. 4 schematically illustrates another embodiment of a method for reducing an impact of malware during a booting sequence for an interrupt driven computing device.

FIG. 4 schematically illustrates another embodiment of a method for reducing an impact of malware during a booting sequence for an interrupt driven computing device. The interrupt vector table (IVT), set up during the system level portion of the booting process, may have many interrupt vectors which will not be needed by the operating system that will be loaded or by the main( ) function in an embedded system. In step 64, one or more of these unused interrupt vectors in the IVT are replaced. For example, one or more pointers in the IVT that will not be required by the operating system loader, or which has negligible functionality, may be replaced with a custom interrupt handler that simply includes an interrupt return instruction. This can greatly reduce the surface area that malware can attack in order to gain execution control over the boot process. Furthermore, if malware has already infected some of the vectors which are replaced, then the malware may be neutralized because a pointer to it no longer is present.

The surface area that malware can attack may further be reduced in step 66 by implementing a function filter for one or more interrupt vectors in the IVT to disallow unnecessary interrupt functions from being executed. Every interrupt vector in the IVT can route execution control to many, sometimes hundreds, of different functions. The function filter of step 66 disallows execution control to be passed to any of the interrupts' unrequired functions. For example, if any of the filtered functions are called, then an interrupt return may be executed instead of routing control to the filtered function.

The remaining interrupt vector functions are still a potential avenue of attack for malware, and cannot be filtered because they are required for boot process software to load the operating system or required by the main( ) function in an embedded system. To remove the threat of malware hooking into the remaining functions, in step 68, one or more required interrupt vector functions may be replaced with one or more corresponding custom vector functions. Specifications for existing interrupt vector functions are readily available for many computing devices. Similarly, proprietary computing devices also have proprietary interrupt vector function specifications readily available to people with the appropriate security, corporate, and/or government clearances. Such specifications define how to provide the required functionality. As just one example, on an Intel® based x86 microprocessor, interrupt 0x13 requires interaction with a CD-drive which is defined by the ATA/ATAPI specification. Such specification is well known to those skilled in the art. A corresponding custom vector function may be written to provide the necessary functionality according to the specification. The creation of custom vector functions to replace one or more required interrupt vector functions is within the abilities of those of ordinary skill in the art without the need for undue experimentation.

Each of the steps 64, 66, and 68, whether implemented on its own, or in any combination with one of the others, or all together, are embodiments of manipulating 50 one or more parameters associated with an interrupt vector table (IVT) to force the computing device into a clean state following a system level portion of the booting sequence.

Despite performing one or more of the steps 64, 66, and 68, although they may reduce an impact of malware during a booting sequence, it may still be possible for malware to reside in a hard-coded memory address that could be called directly by malware executing later in time. To mitigate against this risk, one or more memory locations may optionally be wiped 70 if the one or more memory locations do not hold at least a portion of the IVT and/or the interrupt vector functions. For example, all of the memory locations that have not been directly modified or controlled can be erased. In steps 64, 66, and 68, the locations of all safe code are known, and every other memory location may be erased. Once the possible impact of malware has been reduced during a booting sequence, using the embodiments disclosed above and/or their equivalents, an operating system may be loaded 72 or a call to a non-returnable main( ) function may be made 74.

Figure 5:
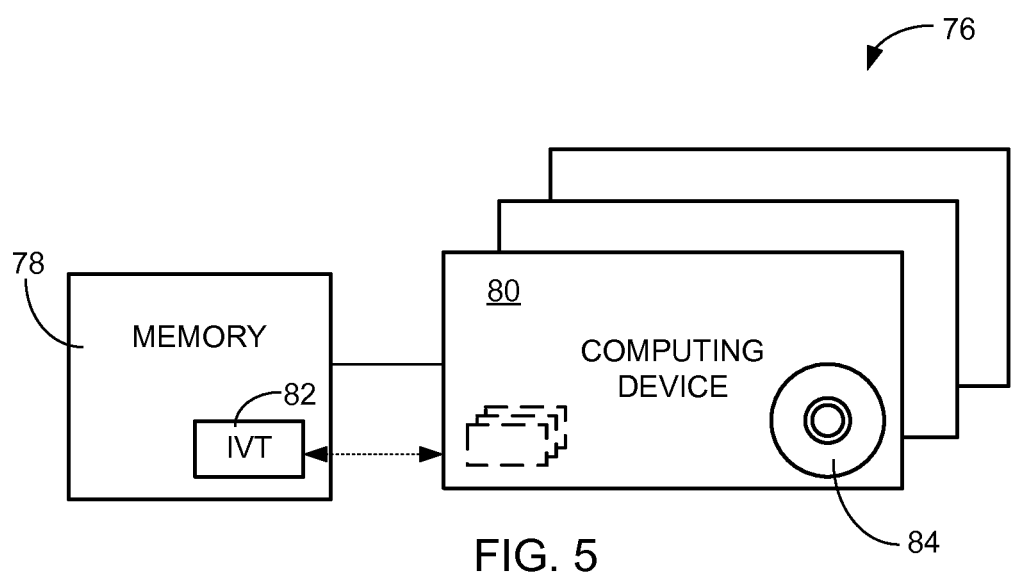
FIGS. 5-7B schematically illustrate embodiments of a system for reducing an impact of malware during a booting sequence for an interrupt driven computing device.

FIG. 5 schematically illustrates an embodiment of a system 76 for reducing an impact of malware during a booting sequence for an interrupt driven computing device. The system 76 includes a memory 78 that may be any type of writable memory, such as, but not limited to RAM. The system 76 also includes one or more computing devices 80 configured to execute a system-level portion of a booting sequence comprising establishment of an interrupt vector table (IVT) 82 in the memory 78. The memory 78 may be internal to or external to the computing device 80. The memory 78 may also be a fixed memory or a removable memory. The one or more computing devices 80 may be one or more computers, laptops, servers, microprocessors, processors, multi-core processors, mobile computing devices, mobile phones, personal digital assistants (PDAs), smart phones, embedded systems, application specific integrated circuits (ASICs), field programmable gate arrays (FPGAs), digital circuitry, analog circuitry, or any combination or plurality thereof. The one or more computing devices 80 are also configured to manipulate one or more parameters associated with the IVT 82 to force the memory 78 into a clean state following the system level portion of the booting sequence. Suitable methods for such manipulations have been discussed above with regard to FIGS. 2-4. The one or more computing devices 80 may be configured to read a computer program product 84, which may comprise a tangible computer readable storage medium such as, but not limited to a CD-ROM, a DVD, a flash memory, a diskette, a magnetic storage media, an optical storage media, an electronic storage medium, a random access memory (RAM), a read only memory (ROM), and a memory stick. The storage medium is readable by at least one of the one or more computing devices 80 and stores instructions for execution by the one or more computing devices 80 for performing a method for reducing an impact of malware during a booting sequence as discussed in the embodiments above.

Figure 6A:
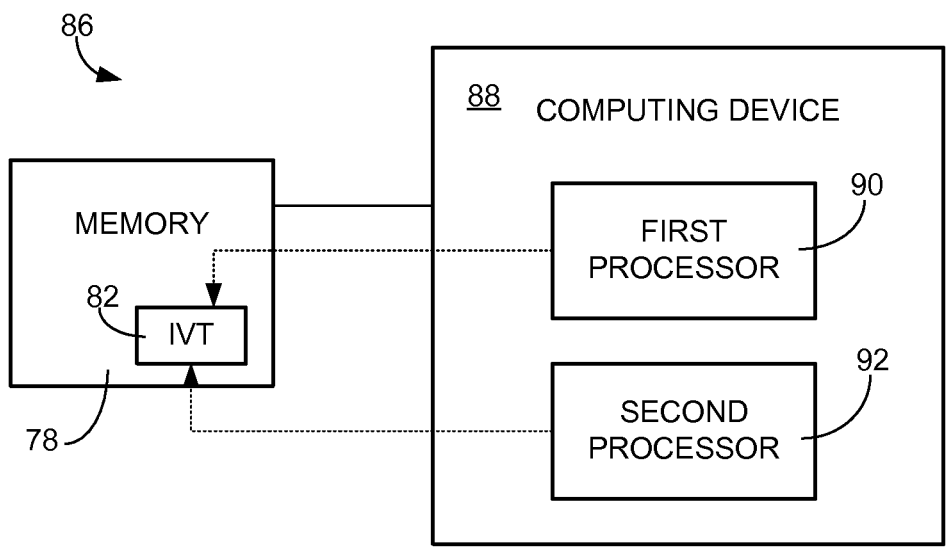

FIG. 6A schematically illustrates an embodiment of a system 86 for reducing an impact of malware during a booting sequence for an interrupt driven computing device. The system 86 includes a memory 78 that may be any type of writable memory, such as, but not limited to RAM, the features of which have been discussed above. The system 86 also includes a computing device 88 which has a first processor 90 and a second processor 92. The first processor 90 is configured to execute a system-level portion of a booting sequence comprising establishment of an interrupt vector table (IVT) 82 in the memory 78. The second processor 92 is configured to manipulate one or more parameters associated with the IVT 82 to force the memory 78 into a clean state following the system level portion of the booting sequence. Suitable methods for such manipulations have been discussed above with regard to FIGS. 2-4.

Figure 6B:
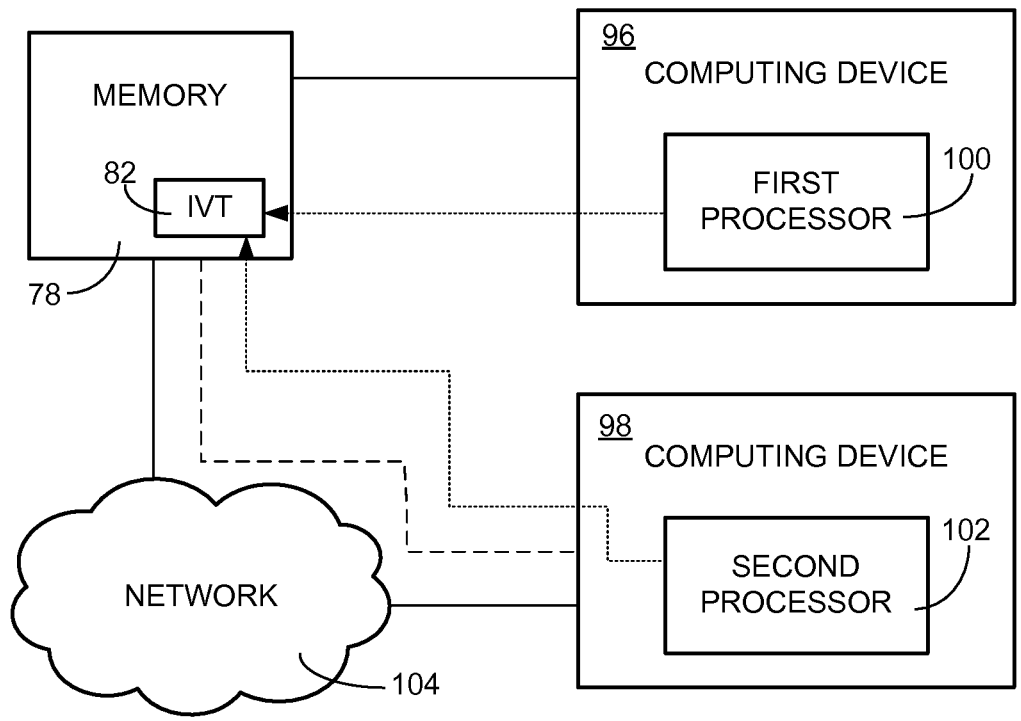

FIG. 6B schematically illustrates an embodiment of a system 94 for reducing an impact of malware during a booting sequence for an interrupt driven computing device. The system 94 includes a memory 78 that may be any type of writable memory, such as, but not limited to RAM, the features of which have been discussed above. The system 94 also includes a first computing device 96 and a second computing device 98. The first computing device 96 has a first processor 100. The second computing device 98 has a second processor 102. The second processor 102 is remotely located from the first processor 100. The first processor 100 is configured to execute a system-level portion of a booting sequence comprising establishment of an interrupt vector table (IVT) 82 in the memory 78. The second processor 102 is configured to manipulate one or more parameters associated with the IVT 82 to force the memory 78 into a clean state following the system level portion of the booting sequence. The second processor 102 may be directly coupled to the memory 78, or it may be coupled indirectly to the memory 78, for example, via a network 104. Suitable methods for such manipulations have been discussed above with regard to FIGS. 2-4.

Figure 7A:
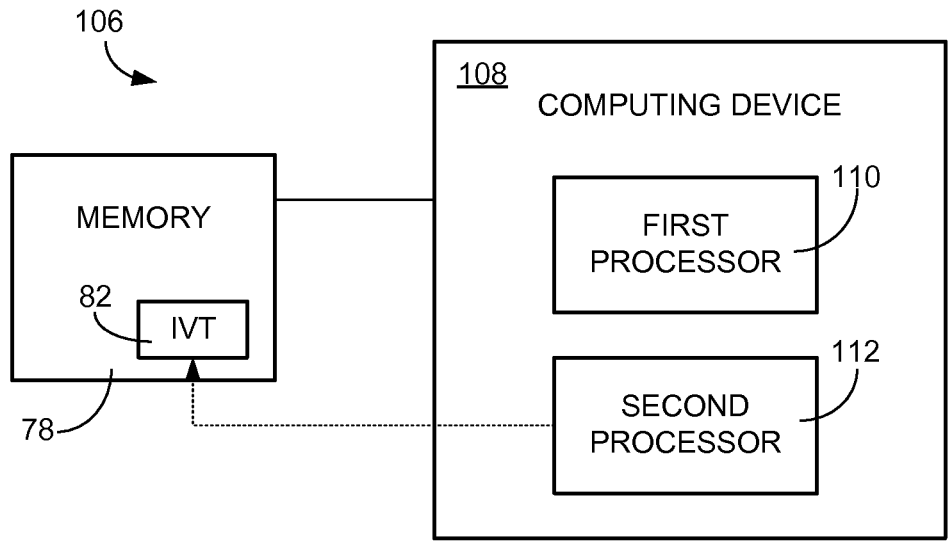

FIG. 7A schematically illustrates an embodiment of a system 106 for reducing an impact of malware during a booting sequence for an interrupt driven computing device. The system 106 includes a memory 78 that may be any type of writable memory, such as, but not limited to RAM, the features of which have been discussed above. The system 106 also includes a computing device 108 which has a first processor 110 and a second processor 112. The second processor 112 acts as a master or a host processor during the booting sequence and is configured to execute a system-level portion of the booting sequence comprising establishment of an interrupt vector table (IVT) 82 in the memory 78. The second processor is also configured to manipulate one or more parameters associated with the IVT 82 to force the memory 78 into a clean state following the system level portion of the booting sequence. Suitable methods for such manipulations have been discussed above with regard to FIGS. 2-4. The first and second processors 110, 112 may be part of a multicore or multiprocessor computing device 108. Both processors 110, 112 may later be used by the operating system, but the second processor 112 handles the booting process for the computing device.

Figure 7B:
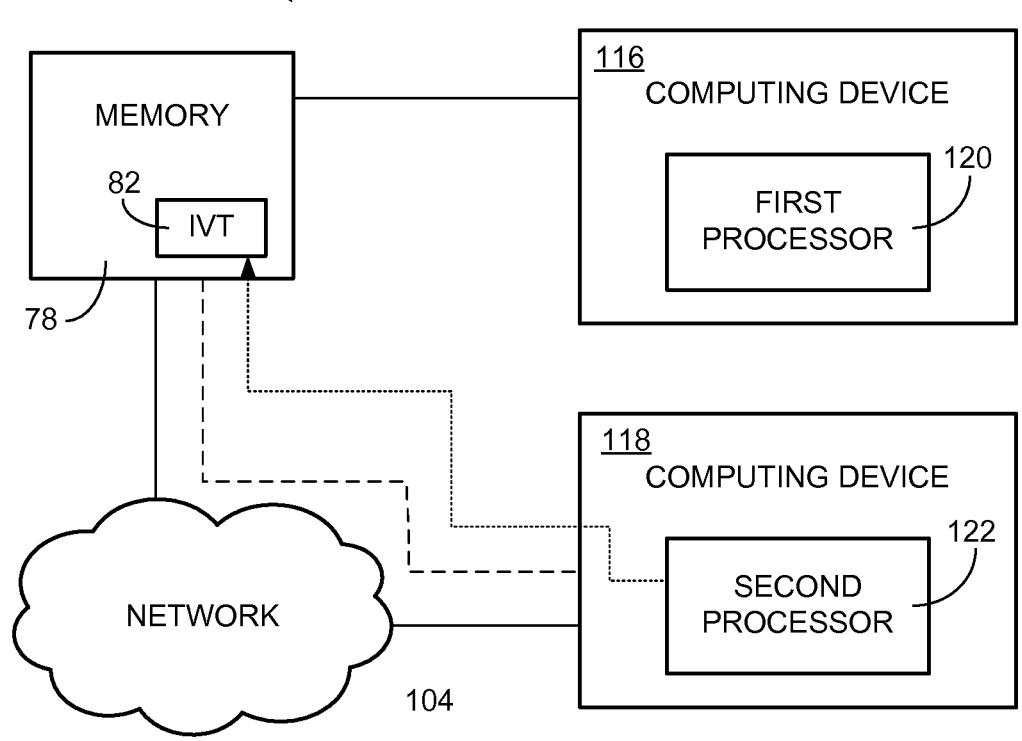

FIG. 7B schematically illustrates an embodiment of a system 114 for reducing an impact of malware during a booting sequence for an interrupt driven computing device. The system 114 includes a memory 78 that may be any type of writable memory, such as, but not limited to RAM, the features of which have been discussed above. The system 114 also includes a first computing device 116 and a second computing device 118. The first computing device 116 has a first processor 120. The second computing device 118 has a second processor 122. The second processor 122 is remotely located from the first processor 120. The second processor 122 is configured to execute a system-level portion of a booting sequence comprising establishment of an interrupt vector table (IVT) 82 in the memory 78. The second processor 122 is also configured to manipulate one or more parameters associated with the IVT 82 to force the memory 78 into a clean state following the system level portion of the booting sequence. The second processor 122 may be directly coupled to the memory 78, or it may be coupled indirectly to the memory 78, for example, via a network 104. Suitable methods for such manipulations have been discussed above with regard to FIGS. 2-4. The first computing device 116 may ultimately take advantage of an operating system which is loaded into the memory 78, but the second computing device 118 is the master or host that takes care of the booting process.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method comprising:
reducing an impact of malware during a booting sequence of an interrupt driven computing device, the reducing comprising:
manipulating one or more parameters associated with an interrupt vector table (IVT) to force the computing device into a clean state following a system level portion of the booting sequence, wherein completion of the booting sequence to boot the interrupt driven computing device is performed in the clean state.

2. The method of claim 1, wherein manipulating one or more parameters associated with the IVT comprises implementing a function filter for one or more interrupt vectors in the IVT to disallow unnecessary interrupt functions from being executed, wherein based on a filtered function being called by an interrupt vector of the IVT, an interrupt return is executed instead of routing control to the filtered function.

3. The method of claim 1, wherein manipulating one or more parameters associated with the IVT comprises replacing one or more required interrupt vector functions with one or more corresponding custom vector functions.

4. The method of claim 1, wherein manipulating one or more parameters associated with the IVT comprises replacing one or more unused interrupt vectors in the IVT by modifying the IVT.

5. The method of claim 4, wherein replacing one or more unused interrupt vectors in the IVT comprises replacing said one or more unused interrupt vectors with a pointer to a custom interrupt handler comprising only an interrupt return instruction.

6. The method of claim 4, wherein manipulating one or more parameters associated with the IVT further comprises implementing a function filter for one or more interrupt vectors in the IVT to disallow unnecessary interrupt functions from being executed, wherein based on a filtered function being called by an interrupt vector of the IVT, an interrupt return is executed instead of routing control to the filtered function.

7. The method of claim 6, wherein the function filter comprises an interrupt return instruction before execution of one or more of the unnecessary interrupt functions.

8. The method of claim 6, wherein manipulating one or more parameters associated with the IVT further comprises replacing one or more required interrupt vector functions with one or more corresponding custom vector functions.

9. The method of claim 8, wherein the one or more corresponding custom vector functions comprise identical input and output parameters to the one or more required interrupt vector functions replaced by the one or more corresponding custom vector functions.

10. The method of claim 8, further comprising:
wiping one or more memory locations if the one or more memory locations do not hold at least a portion of the IVT and/or the interrupt vector functions.

11. The method of claim 1, wherein manipulating one or more parameters associated with the IVT to force the computing device into the clean state following the system level portion of the booting sequence occurs prior to the loading of an operating system.

12. The method of claim 1, wherein manipulating one or more parameters associated with the IVT to force the computing device into the clean state following the system level portion of the booting sequence occurs prior to a call to a non-returnable main( ) function.

13. A system comprising:
a memory; and
one or more computing devices configured to perform:
reducing an impact of malware during a booting sequence of the system, the reducing comprising:
executing a system-level portion of the booting sequence comprising establishment of an interrupt vector table (IVT) in the memory; and
manipulating one or more parameters associated with the IVT to force the memory into a clean state following the system-level portion of the booting sequence, wherein completion of the booting sequence to boot the system is performed with the memory in the clean state.

14. The system of claim 13, wherein the one or more computing devices comprise:
a first processor configured to execute the system level portion of the booting sequence comprising the establishment of the IVT in the memory; and
a second processor configured to manipulate the one or more parameters associated with the IVT to force the memory into the clean state following the system level portion of the booting sequence, wherein the first processor and the second processor are a same processor or different processors.

15. The system of claim 14, wherein the second processor is remotely located from the first processor.

16. The system of claim 14, wherein the first processor is further configured to load an operating system or call a non-returnable main( ) function after the second processor manipulates the one or more parameters associated with the IVT to force the memory into the clean state following the system level portion of the booting sequence.

17. The system of claim 13, wherein the one or more computing devices comprise:
a first processor; and
a second processor configured to execute the system-level portion of the booting sequence and manipulate the one or more parameters associated with the IVT to force the memory into the clean state following the system-level portion of the booting sequence, wherein the first processor and the second processor are a same processor or different processors.

18. The system of claim 17, wherein the second processor is remotely located from the first processor.

19. The system of claim 17, wherein the first processor is further configured to leave the reset state and load an operating system or call a non-returnable main( ) function after the second processor manipulates the one or more parameters associated with the IVT to force the memory into the clean state following the system level portion of the booting sequence.

20. The system of claim 13, wherein the configuration of the one or more computing devices to perform the manipulating of the one or more parameters associated with the IVT comprises a configuration to implement a function filter for one or more interrupt vectors in the IVT to disallow unnecessary interrupt functions from being executed, wherein based on a filtered function being called by an interrupt vector of the IVT, an interrupt return is executed instead of routing control to the filtered function.

21. The system of claim 13, wherein the configuration of the one or more computing devices to manipulate one or more parameters associated with the IVT comprises a configuration to replace one or more required interrupt vector functions with one or more corresponding custom vector functions.

22. The system of claim 13, wherein the configuration of the one or more computing devices to manipulate one or more parameters associated with the IVT comprises a configuration to replace one or more unused interrupt vectors in the IVT by modifying the IVT.

23. The system of claim 22, wherein the configuration of the one or more computing devices to manipulate one or more parameters associated with the IVT further comprises implementing a function filter for one or more interrupt vectors in the IVT to disallow unnecessary interrupt functions from being executed.

24. The system of claim 23, wherein the configuration of the one or more computing devices to manipulate one or more parameters associated with the IVT further comprises replacing one or more required interrupt vector functions with one or more corresponding custom vector functions.

25. The system of claim 24, wherein the one or more computing devices are further configured to wipe one or more locations in the memory if the locations do not hold at least a portion of the IVT and/or the interrupt vector functions.

26. The system of claim 13, wherein the one or more computing devices are further configured to load an operating system or call a non-returnable main( ) function after manipulating the one or more parameters associated with the IVT to force the memory into the clean state following the system level portion of the booting sequence.

27. A computer program product comprising a non-transitory computer readable storage medium readable by a processor and storing instructions thereon for execution by the processor, the instructions comprising:
instructions for reducing an impact of malware during a booting sequence of an interrupt driven computing device, the instructions for reducing the impact comprising:
instructions to manipulate one or more parameters associated with an interrupt vector table (IVT) to force the computing device into a clean state following a system level portion of the booting sequence, wherein completion of the booting sequence to boot the interrupt driven computing device is performed in the clean state.

28. The computer program product of claim 27, wherein the instructions to manipulate one or more parameters associated with the IVT comprise instructions to implement a function filter for one or more interrupt vectors in the IVT to disallow unnecessary interrupt functions from being executed, wherein based on a filtered function being called by an interrupt vector of the IVT, an interrupt return is executed instead of routing control to the filtered function.

29. The computer program product of claim 27, wherein the instructions to manipulate one or more parameters associated with the IVT comprise instructions to replace one or more required interrupt vector functions with one or more corresponding custom vector functions.

30. The computer program product of claim 27, wherein the instructions to manipulate one or more parameters associated with the IVT comprise instructions to replace one or more unused interrupt vectors in the IVT by modifying the IVT.

31. The computer program product of claim 30, wherein the instructions to replace one or more unused interrupt vectors in the IVT comprise instructions to replace said one or more unused interrupt vectors with a pointer to a custom interrupt handler comprising only an interrupt return instruction.

32. The computer program product of claim 30, wherein the instructions to manipulate one or more parameters associated with the IVT further comprise instructions to implement a function filter for one or more interrupt vectors in the IVT to disallow unnecessary interrupt functions from being executed.

33. The computer program product of claim 32, wherein the function filter comprises an interrupt return instruction before execution of one or more of the unnecessary interrupt functions.

34. The computer program product of claim 32, wherein the instructions to manipulate one or more parameters associated with the IVT further comprise instructions to replace one or more required interrupt vector functions with one or more corresponding custom vector functions.

35. The computer program product of claim 34, wherein the one or more corresponding custom vector functions comprise identical input and output parameters to the one or more required interrupt vector functions replaced by the one or more corresponding custom vector functions.

36. The computer program product of claim 34, wherein the instructions for reducing the impact of malware during the booting sequence for the interrupt driven computing device further comprise:
   instructions to wipe one or more memory locations if the memory locations do not hold at least a portion of the IVT and/or the interrupt vector functions.

37. The computer program product of claim 27, wherein the instructions to manipulate one or more parameters associated with the IVT to force the computing device into the clean state following the method system level portion of the booting sequence are configured to be executed prior to the loading of an operating system.

38. The computer program product of claim 27, wherein the instructions to manipulate one or more parameters associated with the IVT to force the computing device into the clean state following the system level portion of the booting sequence are configured to be executed prior to a call to a non-returnable main( ) function.

39. A method comprising:
   reducing an impact of malware during a booting sequence for an interrupt driven computing device, the reducing occurring prior to the loading of an operating system or prior to a call to a non-returnable main function, the reducing comprising:
      replacing one or more unused interrupt vectors in an interrupt vector table (IVT);
      implementing a function filter for one or more interrupt vectors in the IVT to disallow unnecessary interrupt functions from being executed, wherein based on a filtered function being called by an interrupt vector of the IVT, an interrupt return is executed instead of routing control to the filtered function;
      replacing one or more required interrupt vector functions with one or more corresponding custom vector functions; and
      wiping one or more memory locations if the one or more memory locations do not hold at least a portion of the IVT and/or the interrupt vector functions.

\* \* \* \* \*

UNITED STATES PATENT AND TRADEMARK OFFICE
CERTIFICATE OF CORRECTION

PATENT NO. : 8,478,974 B2
APPLICATION NO. : 12/821845
DATED : July 2, 2013
INVENTOR(S) : Wilson et al.

It is certified that error appears in the above-identified patent and that said Letters Patent is hereby corrected as shown below:

In the Claims:

Column 14, Line 13: Claim 39, Delete "main function" and insert -- main( ) function --

Signed and Sealed this
Third Day of September, 2013

Teresa Stanek Rea
*Acting Director of the United States Patent and Trademark Office*